United States Patent
Tyagi et al.

(10) Patent No.: US 9,877,100 B1
(45) Date of Patent: Jan. 23, 2018

(54) AUDIO SENSING TO ALERT DEVICE USER

(71) Applicant: Motorola Mobility LLC, Chicago, IL (US)

(72) Inventors: Vivek Tyagi, Chicago, IL (US); Sudhir Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/250,296

(22) Filed: Aug. 29, 2016

(51) Int. Cl.
  G10K 11/16 (2006.01)
  H04R 1/10 (2006.01)
  G10L 15/22 (2006.01)

(52) U.S. Cl.
  CPC ............ H04R 1/1041 (2013.01); G10L 15/22 (2013.01); *G10L 2015/223* (2013.01); *H04R 2420/03* (2013.01); *H04R 2420/07* (2013.01)

(58) Field of Classification Search
  CPC ................................................ G10K 2210/108
  USPC ..... 370/815.46; 381/94.5, 57, 122, 375, 315
  See application file for complete search history.

(56) References Cited

U.S. PATENT DOCUMENTS

| 8,917,186 | B1 | 12/2014 | Grant | |
|---|---|---|---|---|
| 2001/0046304 | A1* | 11/2001 | Rast | H04R 1/1041 381/74 |
| 2004/0034441 | A1 | 2/2004 | Eaton et al. | |
| 2005/0033984 | A1 | 2/2005 | Doherty et al. | |
| 2008/0162133 | A1 | 7/2008 | Couper et al. | |
| 2011/0140882 | A1 | 6/2011 | Jang | |
| 2013/0072599 | A1 | 3/2013 | Yao | |
| 2013/0154843 | A1 | 6/2013 | Lan | |
| 2013/0279725 | A1* | 10/2013 | Ren | H04R 1/1041 381/309 |
| 2014/0185828 | A1* | 7/2014 | Helbling | H03G 5/165 381/103 |
| 2015/0222977 | A1* | 8/2015 | Angel, Jr. | H04R 1/105 381/74 |
| 2016/0239563 | A1 | 8/2016 | Fontaine | |

OTHER PUBLICATIONS

Office Action from related U.S. Appl. No. 14/754,735 dated Sep. 22, 2016.

* cited by examiner

*Primary Examiner* — Kevin Kim
(74) *Attorney, Agent, or Firm* — Amerson Law Firm, PLLC

(57) ABSTRACT

A method includes identifying an active state of a headset interface of a device. A signal generated by a microphone of the device is monitored to identify an alert trigger not initiated by a user of the device. Operation of the headset interface is interrupted responsive to identifying the alert trigger. A device includes a microphone, a headset interface, and a processor coupled to the microphone and the headset interface. The processor is to identify an active state of the headset interface, monitor a signal generated by the microphone to identify an alert trigger not initiated by a user of the device, and interrupt operation of the headset interface responsive to identifying the alert trigger.

18 Claims, 2 Drawing Sheets

AUDIO SENSING TO ALERT DEVICE USER

BACKGROUND

Field of the Disclosure

The disclosed subject matter relates generally to mobile computing systems and, more particularly, to alerting a device user to potential alert situations using audio sensing.

Description of the Related Art

Users of mobile devices often employ headsets when engaging in activities such as listening to music or watching video streams. Headset usage improves the audio experience, but isolates the user from the surrounding environment. Such an isolated user may be unaware of other attempts to communicate with them, such as calling the user's name or attempting to warn the user of a dangerous or emergency scenario.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
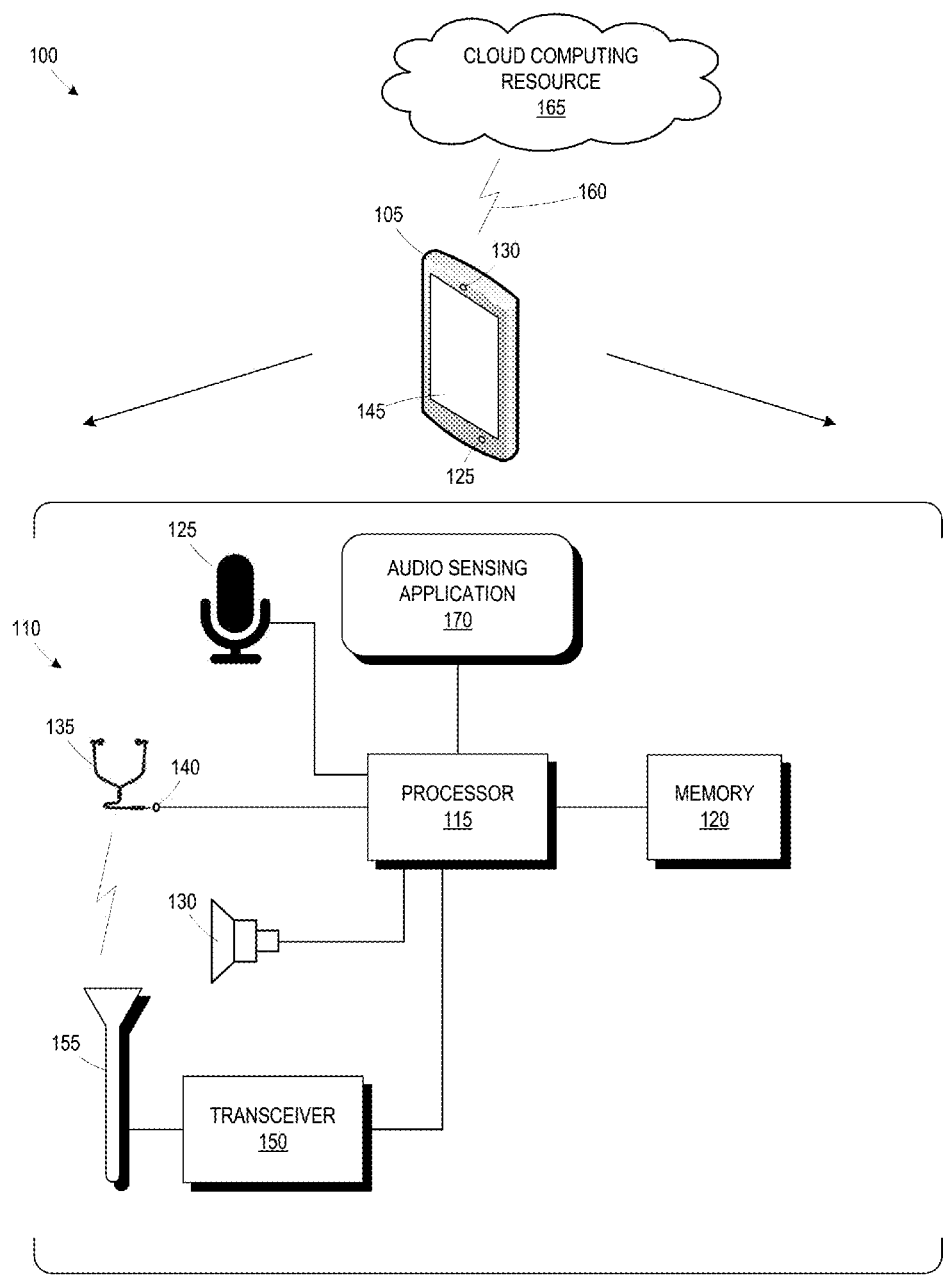
FIG. 1 is a simplified block diagram of a communication system for enabling audio sensing to alert a device user during periods of headset usage.
Figure 2:
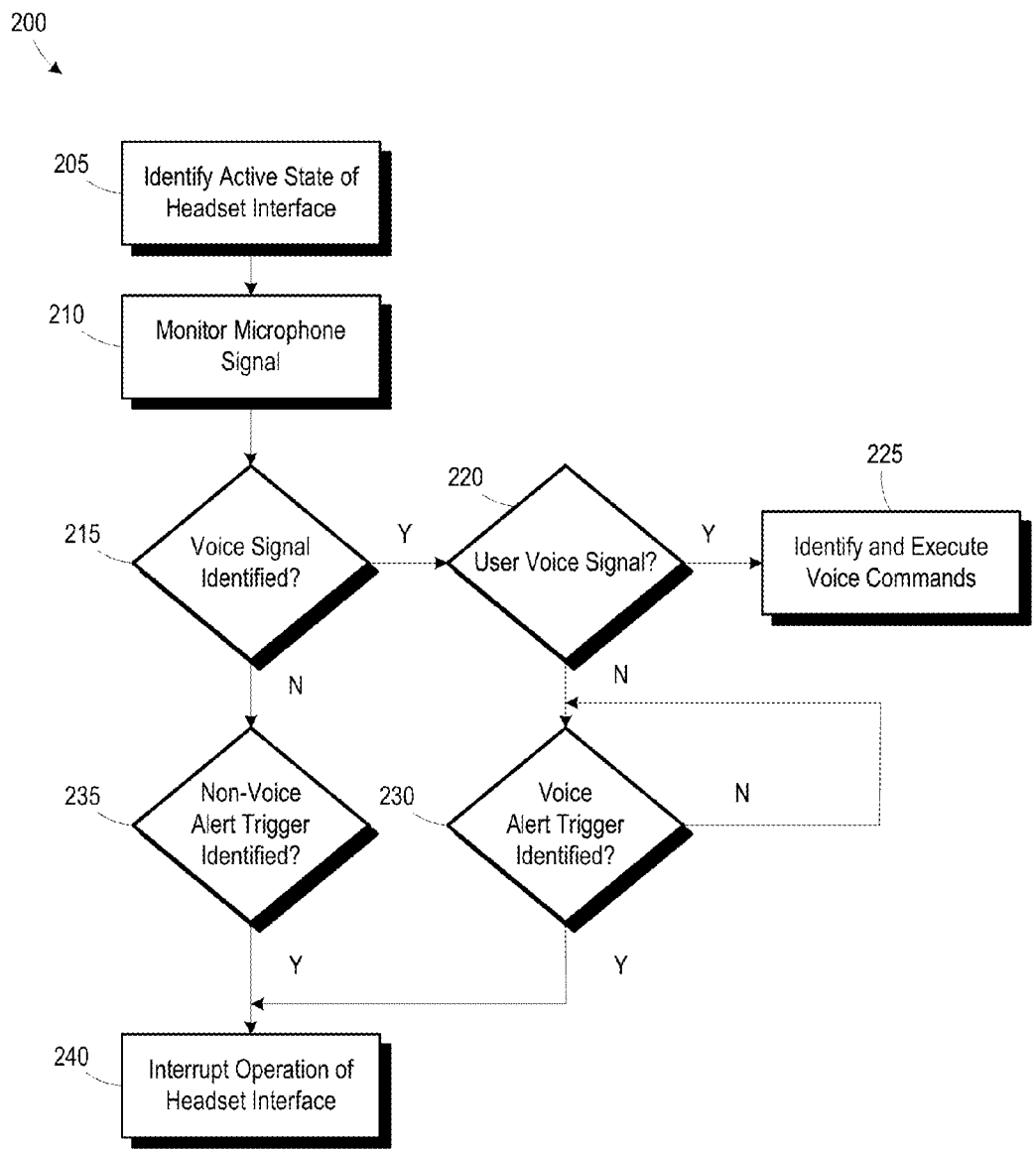
FIG. 2 is a flow diagram of a method for audio sensing to alert a device user during periods of headset usage, according to some embodiments disclosed herein.

FIGS. 1-2 illustrate example techniques for audio sensing to alert a device user during periods of headset usage. While a headset interface of the device is engaged, the device monitors external audio cues to attempt to identify alert scenarios. Upon identifying an alert scenario, the device may alert the user by interrupting the operation of the headsets, providing an alert tone, etc.

FIG. 1 is a simplistic block diagram of a communications system 100 including a device 105. The device 105 implements a computing system 110 including, among other things, a processor 115, a memory 120, a microphone 125, a speaker 130, a headset interface 135 for interfacing with an external headset 140 (e.g., headphones with two ear pieces as illustrated or a single ear headset), and a display 145. The memory 120 may be a volatile memory (e.g., DRAM, SRAM) or a non-volatile memory (e.g., ROM, flash memory, hard disk, etc.). The device 105 includes a transceiver 150 for transmitting and receiving signals via an antenna 155 over a communication link 160. The transceiver 150 may include one or more radios for communicating according to different radio access technologies, such as cellular, Wi-Fi, Bluetooth®, etc. The communication link 160 may have a variety of forms. In some embodiments, the communication link 160 may be a wireless radio or cellular radio link. The communication link 160 may also communicate over a packet-based communication network, such as the Internet. In one embodiment, a cloud computing resource 165 may interface with the device 105 to implement one or more of the functions described herein.

In some embodiments, the headset interface 135 may include a female connector for receiving a male connector from the headsets 130. In other embodiments, the headset interface 135 may be a wireless interface implemented using the transceiver 150 and the antenna 155 (e.g., Bluetooth®).

In various embodiments, the device 105 may be embodied in a handheld or wearable device, such as a laptop computer, a handheld computer, a tablet computer, a mobile device, a telephones, a personal data assistant, a music player, a game device, a wearable computing device, and the like. To the extent certain example aspects of the device 105 are not described herein, such example aspects may or may not be included in various embodiments without limiting the spirit and scope of the embodiments of the present application as would be understood by one of skill in the art.

In the device 105, the processor 115 may execute instructions stored in the memory 120 and store information in the memory 120, such as the results of the executed instructions. Some embodiments of the processor 115, the memory 120, and the microphone 125 may be configured to implement an audio sensing application 170 and perform portions of a method 200 shown in FIG. 2 and discussed below. For example, the processor 115 may execute the audio sensing application 170 to monitor external audio cues to attempt to identify alert scenarios during periods of headset 135 usage (i.e., when the headset interface 140 is enabled). One or more aspects of the method 200 may also be implemented using the cloud computing resource 165 in addition to the audio sensing application 170.

FIG. 2 is a flow diagram of a method 200 for audio sensing to alert a device user during periods of headset usage, according to some embodiments disclosed herein. In one example, various elements of the method 200 shown in FIG. 2 may be implemented on the device 105. In some embodiments, the cloud computing resource 160 (see FIG. 1) may also be used to perform one or more elements of the method 200.

In method block 205, an active state of the headset interface 140 is identified by the audio sensing application 170. In some embodiments, the active state may be associated with a music application, a video streaming application, an ongoing telephone call, video call, conferencing session, etc. Upon identifying the headset interface active state, the audio sensing application 170 monitors the signal from the microphone 125 to identify alert triggers in method block 210.

Alert triggers may take on various forms, and the user may configure preferences to identify what particular triggers are to be tracked. The alert triggers may selectively include voice triggers and/or sound triggers.

The audio sensing application 170 may implement always on voice (AoV) functionality for the device 105. The audio sensing application 170 may employ a model of the user's voice to attempt to identify spoken commands from the user for interacting with the device 105 (e.g., place call, answer call, play music, change songs, mute, send text, etc.). The voice model may allow the audio sensing application 170 to distinguish between the user's voice and the voices of other individuals.

In method block 215, the audio sensing application 170 determines the presence of a voice signal. In method block 220, the audio sensing application 170 determines if the voice signal is associated with the user (e.g., using a voice model trained for the user during a configuration phase). If the voice signal is associated with the user in method block 220, the audio sensing application 170 identifies and executes voice commands on the device 105 (e.g., AoV functionality).

If the voice signal is not associated with the user in method block 220, the audio sensing application 170 monitors the voice signal for voice alert triggers in method block 230. Example, voice alert triggers may include the user's name, warning phrases (e.g., "Watch Out", "Hey", "Look Out", "Stop", etc.), greeting phrases (e.g., "Excuse Me", "Pardon Me", etc.), or any other phrase specified by the user.

In parallel with the voice signal processing, the audio sensing application 170 may also monitor for non-voice alert triggers in method block 235. When monitoring for non-voice alert triggers, the audio sensing application 170 may employ a sliding sampling window. An audio sample may be compared to a pre-existing library of alert trigger signatures to determine if a match exists. The user may specify what particular non-voice triggers may be tracked. Techniques for generating audio signatures and matching audio samples to the signatures in the library are known to those of ordinary skill in the art, so they are not described in detail herein. For example, the comparison may be implemented in the time domain, the frequency domain, or some combination thereof. Non-voice alert triggers may be associated with alarms or signals generated by devices in the environment, such as a smoke or burglar alarm, a doorbell, a telephone ringing, a car horn, a train signal, etc., or by other sound patterns in the environment, such as a baby crying, a dog barking, etc. Thresholds may also be applied to the alert triggers. For example, a low amplitude car horn or dog barking trigger may be ignored, while an event in close proximity or increasing in amplitude (e.g., getting closer) may be processed as an alert trigger.

Upon identifying a voice alert trigger in method block 230 or a non-voice alert trigger in method block 235, the audio sensing application 170 may interrupt operation of the headset interface 140 in method block 240. In one embodiment, the audio sensing application 170 may disable the headset interface 140. In conjunction with disabling the headset interface, the audio sensing application 170 may also pause the particular application using the headset interface 140 (e.g., pause the music player or video application). In some embodiments, the audio sensing application 170 may communicate an alternative audio signal over the headset interface. The audio sensing application 170 may inject an alert tone. The audio sensing application 170 may inject the audio signal generated by the microphone 125. The audio sensing application 170 may also inject an audio sample that included the alert trigger (e.g., replay the alert event so the user can hear it). The audio sample may be accompanied by an alert tone so that the user realizes that the signal is not live, but rather a replay. In some embodiments, the audio sample may be filtered so that only the alert trigger is replayed, while background noise (e.g., dog barking, other conversations, street noise, etc.) is filtered out. The particular interruption techniques may be based on a classification associated with the alert trigger and/or based on user preferences. For example, urgent warning alert triggers may be processed by stopping the audio feed or rerouting the microphone output, as a replay might further distract the user or confuse the user regarding its temporal proximity.

Enabling the monitoring of external alert triggers while the user is engaged in an activity using the headset interface 140 improves the user experience and alerts the user to potential urgent situations.

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes identifying an active state of a headset interface of a device. A signal generated by a microphone of the device is monitored to identify an alert trigger not initiated by a user of the device. Operation of the headset interface is interrupted responsive to identifying the alert trigger.

A device includes a microphone, a headset interface, and a processor coupled to the microphone and the headset interface. The processor is to identify an active state of the headset interface, monitor a signal generated by the microphone to identify an alert trigger not initiated by a user of the device, and interrupt operation of the headset interface responsive to identifying the alert trigger.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method comprising:
    identifying an active state of a headset interface of a device;
    monitoring a signal generated by a microphone of the device to identify an alert trigger not initiated by a user of the device, wherein monitoring the signal further comprises identifying an external human voice signal, executing device commands in the external human voice signal responsive to the external human voice signal being associated with the user, and identifying the alert trigger responsive to the external human voice signal not being associated with the user; and
    interrupting operation of the headset interface responsive to identifying the alert trigger.

2. The method of claim 1, wherein interrupting operation of the headset interface comprises disabling the headset interface.

3. The method of claim 1, wherein interrupting operation of the headset interface comprises pausing an application on the device communicating over the headset interface.

4. The method of claim 1, wherein interrupting operation of the headset interface comprises communicating an alert audio signal over the headset interface.

5. The method of claim 1, wherein interrupting operation of the headset interface comprises communicating a signal from the microphone over the headset interface.

6. The method of claim 1, wherein interrupting operation of the headset interface comprises communicating an audio sample including the alert trigger over the headset interface.

7. The method of claim 1, wherein monitoring the signal generated by the microphone of the device to identify the alert trigger comprises identifying an alert trigger phrase.

8. The method of claim 1, wherein identifying the alert trigger phrase comprises identifying that the alert trigger phrase was not spoken by the user.

9. The method of claim 1, wherein the headset interface comprises a wireless headset interface.

10. A device, comprising:
    a microphone;
    a headset interface; and
    a processor coupled to the microphone and the headset interface, wherein the processor is to identify an active state of a headset interface, monitor a signal generated by the microphone to identify an alert trigger not initiated by a user of the device, identify an external human voice signal, execute device commands in the external human voice signal responsive to the external human voice signal being associated with the user, identify the alert trigger responsive to the external human voice signal not being associated with the user, and interrupt operation of the headset interface responsive to identifying the alert trigger.

11. The device of claim 10, wherein the processor is to interrupt operation of the headset interface by disabling the headset interface.

12. The device of claim 10, wherein the processor is to interrupt operation of the headset interface by pausing an application on the device communicating over the headset interface.

13. The device of claim 10, wherein the processor is to interrupt operation of the headset interface by communicating an alert audio signal over the headset interface.

14. The device of claim 10, wherein the processor is to interrupt operation of the headset interface by communicating a signal from the microphone over the headset interface.

15. The device of claim 10, wherein the processor is to interrupt operation of the headset interface by communicating an audio sample including the alert trigger over the headset interface.

16. The device of claim 10, wherein the processor is to identify an alert trigger phrase.

17. The device of claim 10, wherein the processor is to identify that the alert trigger phrase was not spoken by the user.

18. The device of claim 10, wherein the headset interface comprises a wireless headset interface.

* * * * *